2,910,905
Patented Nov. 3, 1959

United States Patent Office 2,910,905

SLIDABLE TAILSTOCK

Louis J-M. Gamet, Bougival, France, assignor to La Precision Industrielle (Societe Anonyme), Rueil-Malmaison, Seine-et-Oise, France, a French company Application December 21, 1954, Serial No. 476,780

Claims priority, application France January 19, 1954

7 Claims. (Cl. 82—31)

The known kinds of rotatable sliding spindles are generally carried by bearings housed in sleeves which do not rotate but which are adapted to slide longitudinally. The axial stresses to which the spindle is subjected are thus transmitted to the sleeves by these bearings. When these stresses are considerable, the bearings are heavily overloaded with the result that they wear rapidly and the accuracy of centering of the spindle is seriously affected.

In order to overcome this drawback, it has already been proposed to apply directly upon the spindle an axial thrust, so as to protect the bearings from the effects of the said thrust.

In a known arrangement of this kind, the spindle is rigidly coupled to the piston of a fluid jack, the cylinder of which is fixed. An arrangement of this kind has serious disadvantages. As the piston, which is rigid with the spindle, must turn inside the cylinder and also at the same time it must be able to slide along the cylinder, the piston must be accurately centered with respect to the cylinder in all its possible positions along the length of the cylinder. However, the cylinder is fixed, whilst the sleeve which carries the spindle and centers it, is movable. These two parts are thus independent and a precise adjustment of the piston over the whole length of the bore of the cylinder is, for this reason, a very delicate operation. Now, any error of centering of the piston may lead to seizure, particularly at high speeds of rotation, and the consequences may therefore be extremely serious.

The present invention has the object of providing a remedy for this disadvantage.

In accordance with the invention, the spindle is rotatably mounted in the front portion of the sliding sleeve and closes the said sleeve at its central portion, whilst the rear part of the said sleeve comprises a fixed piston, means being provided to enable variation of the quantity of a fluid enclosed in the space comprised within the sleeve between the said piston and the closure constituted by the spindle inside the sleeve.

In other words, in the form of embodiment in accordance with the invention, the sleeve itself constitutes the cylinder of a jack movable with respect to its piston, the thrust on the spindle being effected by the rotatable base of this cylinder which is rigid with the said spindle.

Thus, the two possible causes of seizure are eliminated since, on the one hand, the spindle always rotates with respect to the same portion of the cylinder while, on the other hand, the cylinder and the sleeve form one single member.

The invention is especially applicable to the tail-stocks of lathes in which the rotation of the spindle is induced by the rotation of the work-piece. It is also applicable to the case in which the spindle is positively driven; in this case, the spindle drive may be readily obtained from a driving shaft which passes through the rear portion of the sleeve.

The description which follows below with regard to the attached drawings (which are given by way of example only and not in any sense by way of limitation) will make it quite clear how the invention may be carried into effect.

Fig. 2a shows an alternative form of construction of the front part of Fig. 2 which enables the spindle to be fixed at will.

Figure 1:
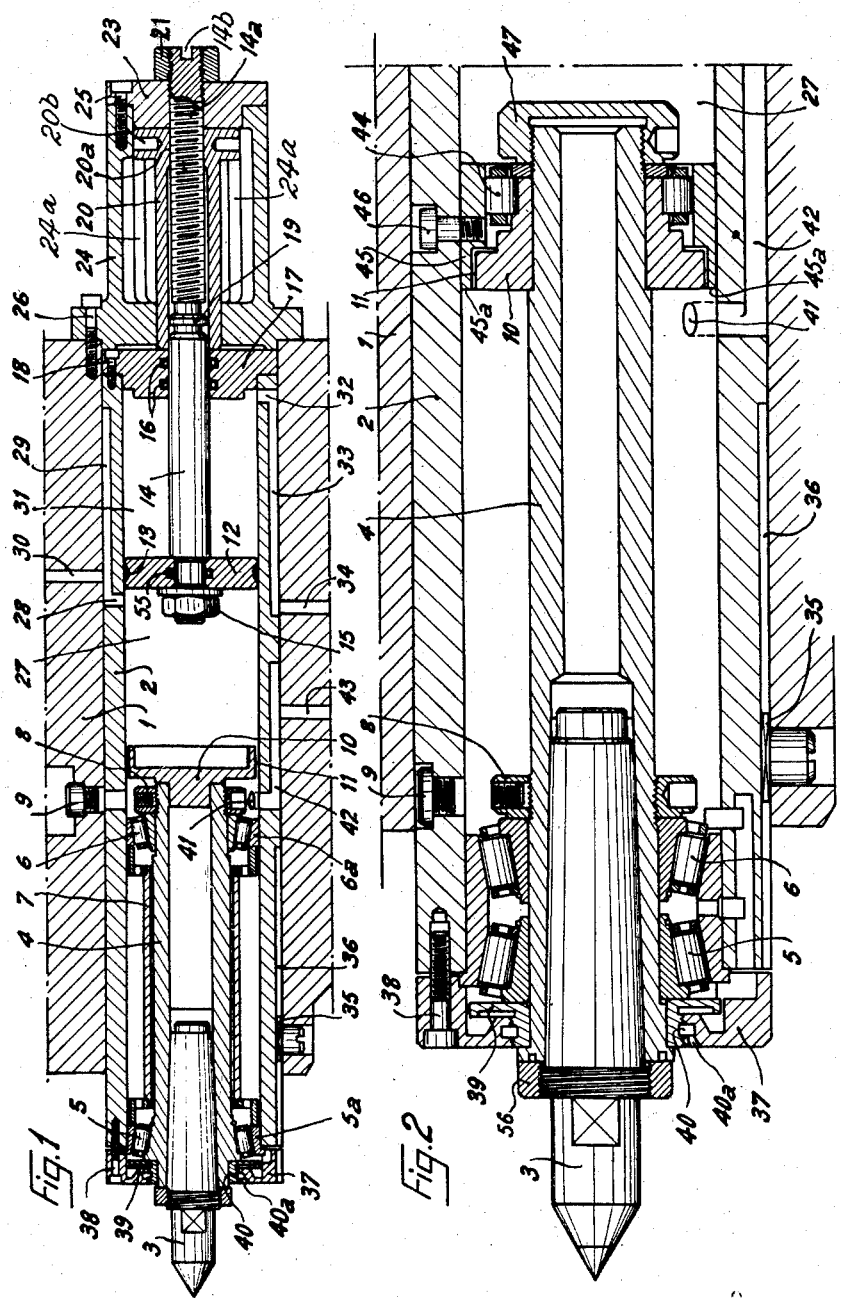
Fig. 1 is an axial cross-section of the general arrangement of a rotatable sliding spindle which may be used as the tail-stock of a lathe.

In the sliding head-stock 1 of a lathe, of which only the portion concerning the invention has been shown, is arranged to slide a sleeve 2 which carries the rotatable lathe-center 3. This lathe-center has a tapered portion fitted into the spindle 4 which rotates inside the sleeve 2 by virtue of two conical bearings 5 and 6 inclined in opposite directions to each other. The external rings 5a and 6a of these conical bearings are spaced apart by means of the spacing member 7. The adjusting nut 8, which is accessible through the plug member 9, permits of a relative axial displacement of the internal rings of these conical bearings, so as to take up any play.

At the inner extremity of the spindle 4, the latter carries the cylindrical member 10 which closes the sleeve at its central portion, leaving however a slight clearance 11 between the internal wall of the sleeve and the said cylindrical member, so as to permit the latter to rotate inside the sleeve. The rear portion of the sleeve contains the fixed piston 12, with respect to which the said sleeve can slide with a fluid-tight fitting, by virtue of the packing rings 13. The piston 12 is carried by a cylindrical rod 14 on which it is fixed longitudinally by means of the nut 15; the fluid-tight packing ring 55 prevents leakages between the rod 14 and the piston. In addition, this rod passes through the base member 17, through packing rings 16 which close in a fluid-tight manner the extremity of the sleeve opposite to the lathe-center. This base 17 is fixed in position by means of screws 18.

The rod 14 is centered by means of a shouldered portion 19 inside a socket 20 which is threaded at 20a so as to screw on to the threaded portion 14a of the rod 14. This threaded portion 14a is also screwed through the supporting plate 23 and is provided with a locking nut 21. The plate 23 is rigidly fixed to the head-stock by means of the tubular collar 24 which is formed with longitudinal apertures 24a and to which it is secured by means of the assembly screws 25 and 26.

In this way, the rod 14 and, in consequence, the piston 12 are fixed in a longitudinal position with respect to the head-stock. In addition, by slackening of the nut 21 and rotating the rod 14 for example with a screw-driver inserted into the slot 14b, the longitudinal position of the piston 12 in the head-stock may be regulated, that is to say the travel toward the left of the sleeve 2 may be regulated with respect to this head-stock. In the position shown in Fig. 1, the piston 12 is displaced to its maximum extent towards the left and the maximum extent to which the sleeve 2 can travel towards the left from the fully traversed position towards the right, as shown in Fig. 1, is represented by the distance between the base 17 and the opposite face of the piston 12. The position of the socket 20 along the rod 14 may be adjusted by rotating the socket with a key pin inserted through the longitudinal apertures 24a and into the holes 20b. The travel of the sleeve 2 towards the right may thus be adjusted or limited. The adjustment of the positions of the piston 12 and of the socket 20 enables the useful travel of the sleeve 2 to be adjusted without displacing the head-stock, this travel being preferably made as small as possible in order to avoid loss of time during working. This useful travel towards the left is determined by contact of the lathe-center 3 with the work piece and towards the right by contact of the base 17 with the left-hand extremity of the socket 20.

The rear portion of the sleeve forms, with the piston 12, a double-acting jack, one of the bases of which is rotatable.

In this jack, the compartment 27 comprised between the piston 12 and the member 10 communicates with a fluid supply conduit 30 by means of the drilled hole 28 and the groove 29 formed in the sleeve. The compartment 31, comprised between the piston and the base 17 communicates in the same way with a second supply conduit 34 through the drilled hole 32 and the groove 33 formed in the sleeve.

In addition, in the embodiment shown, the sleeve 2 is prevented from rotating with respect to the head-stock by means of a key 35 sliding in the longitudinal slot 36 in the sleeve, and the extremity of the sleeve is closed by a cover 37 held in place by screws 38. The part of the spindle passing through this cover is provided with a flanged bushing 39 to prevent oil leakage. This flange may be made in the shape of a turbine if the spindle always rotates in the same direction, or in the form of a ring with annular grooves 39a (see Fig. 2a) if the spindle rotates in both directions. The flanged bushing 39 and the cover 37 are furthermore provided with oppositely-disposed grooves 40 connected to the exterior by the orifice 40a.

The arrangement which has just been described operates in the following manner:

If oil under pressure is applied to the conduit 30, the conduit 34 being open to discharge, the oil which fills the compartment 27 and which is in contact with the fixed piston 12, acts on the cylindrical member 10 and pushes the assembly of the sleeve and the spindle towards the left. As soon as the lathe-centre 3 comes into contact with the rotating work-piece, the spindle 4 begins to rotate, this being permitted by the freedom of the mounting of the cylindrical member 10 inside the sleeve (clearance 11).

When the cylindrical member 10 has applied to it the thrust of the oil, this thrust compensates that applied to the lathe-centre 3 and the bearings 5 and 6 are not directly subjected to this axial thrust.

There will clearly be a flow of oil through the annular space 11. This flow of oil is utilised for the lubrication of the bearings 5 and 6. In fact, this oil accumulates towards the bottom of the front part of the sleeve and becomes established at a level which is determined by that of the orifice 41 bored in the sleeve and which communicates with a groove 42 formed in the same sleeve so as to pass out excess of oil through the conduit 43. Towards the front of the sleeve, the flow through the space comprised between the spindle and the cover is prevented by the flanged bushing 39, and the small quantity of oil which may nevertheless pass through this bushing is collected in the grooves 40 and flows out to the exterior through the orifice 40a. Liquids such as soluble oil or cooling water which are injected on to the lathe-center, and which may also penetrate into the grooves 40, are also evacuated through the orifice 40a.

In order to cause withdrawal of the lathe-center, oil under pressure is applied through the conduit 34 whilst the conduit 30 is set to discharge. The sleeve then withdraws until the base 17 comes in contact with the left-hand end of the socket 20.

It will be noted that, by virtue of the space occupied by the rod 14 in the compartment 31, there will be obtained, for the same rate of flow through the conduits 30 and 34, a return movement of the tail-stock which is more rapid than its forward movement.

In the embodiment shown in Fig. 1, when the lathe-center 3 has come into contact with the work-piece, the sleeve 2 is no longer subjected to any longitudinal stress and, in consequence, it may move longitudinally within the limits of clearance permitted by the bearings 5 and 6. As the play of the front bearing 5 has not been taken up, the lathe-center 3 may become badly centered.

Figure 2:
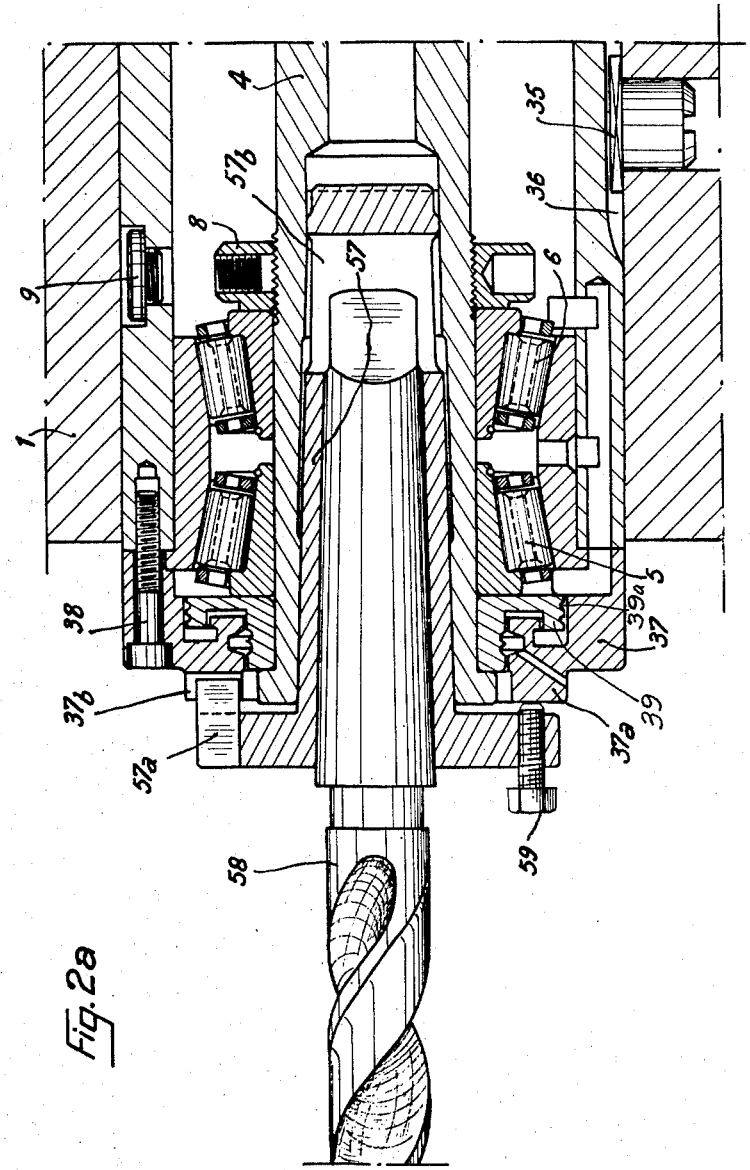
Fig. 2 shows an alternative form of construction of the front part of this assembly.

In order to remedy this drawback, the front portion of the sleeve is preferably constructed as shown in Fig. 2.

The conical bearings 5 and 6 which support and center the lathe-center 3 are disposed towards that extremity of the sleeve which is turned towards the spindle. The cylindrical member 10, which is provided to close the sleeve, is itself directly centered by a cylindrical roller bearing 44, the external ring 45 of which is centered in the sleeve and is retained by the screw 46. The closure of the sleeve is completed by a screw plug 47 which closes the extremity of the spindle towards the interior of the sleeve.

In this way, the cylindrical member 10 will have a diameter less than that of the sleeve 2, and the left-hand end area of compartment 27 upon which the thrust of the oil is effectively applied, comprises practically a circular rotatable part having the maximum diameter of the member 10, and an annular fixed area, equivalent to 45a, which is carried by the ring 45, is rigid with the sleeve and separated from the rotating portion by the space 11. The surface of this annular area 45a is, in consequence, subjected in the same way as the spindle itself through the member 10, to the axial thrust of the fluid admitted into the compartment 27. In this way, the sleeve is itself permanently subjected, when the compartment 27 is under pressure, to a thrust of the same direction as that which is applied to the spindle. Thus, the external ring of the bearing 5 being slightly flared outwards towards the exterior, is forced against the rollers of this bearing by a slight but constant hydraulic initial pressure which prevents any play arising in this bearing from permitting the spindle 4 to become out-of-centre during rotation.

In the embodiment shown in Fig. 2, the lathe-centre 3 is engaged by a taper fitting directly in the extremity of the spindle 4. In order to remove the lathe-centre, the extractor nut 56 has been provided. It is however not possible to prevent rotation of the spindle 4 so as to permit, for example, of axial drilling on a lathe.

The alternative form of embodiment shown in Fig. 2a overcomes this disadvantage.

The cover 37 is provided with an annular flange 37a in which there is formed a slot 37b. The spindle 4 may, as previously, receive directly in its conical opening the cone of a lathe-centre or alternatively, a conical sleeve 57 provided with a finger 57a which engages in the slot 37b. As the cover 37 does not rotate, the spindle 4 is thus held stationary.

The sleeve 57 provided with a female Morse taper may thus receive, for example, a drill 58. The assembly of the sleeve and the drill may be extracted, when the work is finished, by means of the extractor screw 59. The drill and the sleeve may be separated in known manner by means of ports 57b.

In the case of drilling, it is desirable that the sleeve 2 should move slowly and in a regular manner towards the left of Fig. 2a. This may easily be achieved by arranging in the conduit 34 a valve device for throttling the section. Thus the speed of travel of the sleeve 2, by admission of oil under pressure to the compartment 27, is determined by the speed at which the compartment 31 may empty itself, by reason of the throttling of the conduit 34. For the return travel however, when oil under pressure is applied to the compartment 31 through the conduit 34, the valve opens and the return movement of the sleeve 2 towards the right is not subject to any braking effect.

Figure 3:
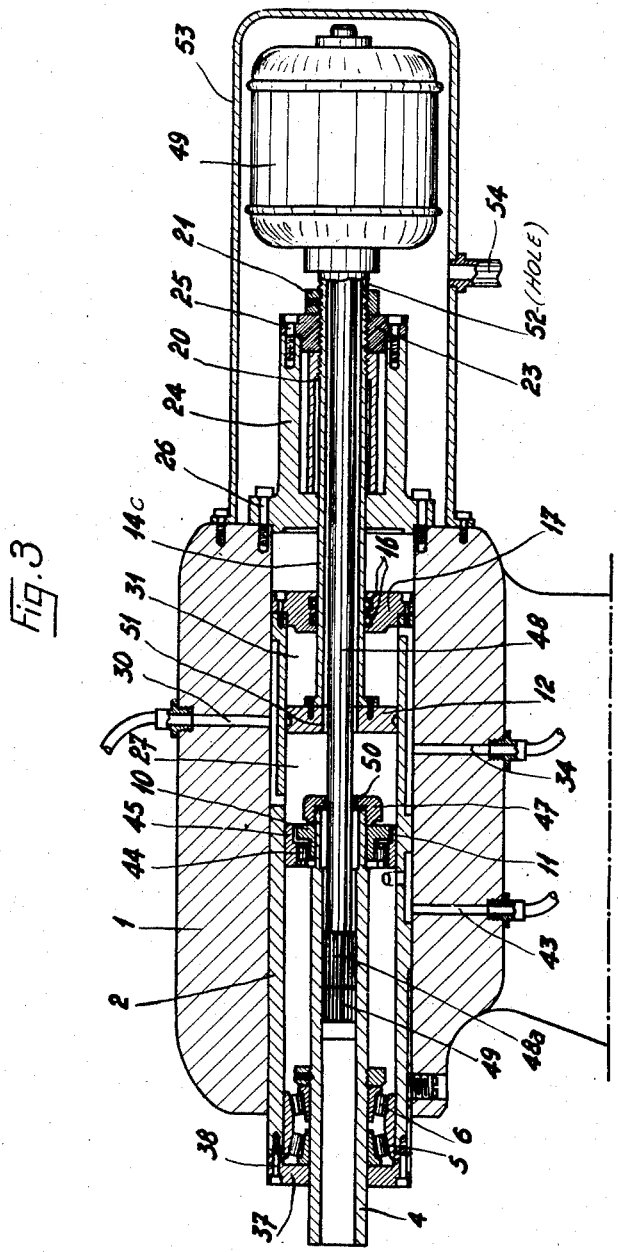
Fig. 3 is an axial cross-section of a driven rotary spindle, for example a drilling or boring spindle.

Fig. 3 shows a driven rotatable sliding spindle constructed in accordance with the invention.

The spindle 4 is driven by means of a shaft 48 rotatably driven from a source 49 of motive power, for example an electric motor or alternatively a mechanical transmission. The extremity of the shaft 48 is provided with a splined head 48a engaged in the axial grooves 49 formed internally of the spindle. The shaft 48 passes through the plug 47 with the interposition of a fluid-tight packing 50. In addition, it passes through the piston 12 through a bore 51 which, in the same way as the annular space 11, permits free rotation of the rotating portion in the non-rotating portion at the cost of a certain leakage of oil contained in the compartment 27. The solid rod 14 of Figure 1 is replaced in Fig. 3 by the tube 14c which supports the piston 12 and, at the same time, serves as a collector for the leakage oil. This oil may pass through a hole 52 bored in the tube, from which it falls into the casing 53 and finally flows out through the conduit 54. The tube 14c is centered, as previously, and is retained by the nuts 20 and 21 and the annular collar 24. The extension of this tube may serve, as shown, for centering and mounting the source 49 of motive power.

In this arrangement, the forward movement of the spindle may be regulated as in the previous case, by means of a valve throttle device or the advance of the rotating spindle may be controlled in known manner by providing a variable automatic throttling of the oil supply according to the rate of the spindle advance.

It will, of course, be understood that modifications may be made to the forms of embodiment which have just been described, in particular by the substitution of equivalent technical means, without thereby departing from the spirit or from the scope of the present invention.

What I claim is:

1. In a machine-tool, a sliding rotatable spindle assembly comprising, a hollow casing, a sleeve slidably fitted in said casing, a spindle extending through and rotatably fitted in said sleeve and having a front end projecting therefrom and a rear end defining a closure member of a diameter slightly less than the internal diameter of the sleeve so as to be spaced slightly at its periphery from the sleeve and to substantially close off said sleeve while being completely out of contact therewith, a roller bearing disposed adjacent the rear end of the spindle and positioned intermediate the spindle and the sleeve to rotatably support the rear end portion of the spindle in the sleeve and to center the closure member relative to the sleeve, a piston slidably and liquid-tightly fitted in the sleeve rearwardly of the closure member, supporting means for the piston, means for securing said supporting means to the casing to provide a stationary position of the piston with respect to the casing and means for supplying pressure liquid to the space in the sleeve between the closure member and the piston.

2. A tailstock comprising a hollow casing, a sleeve slidably fitted in the casing, a hollow spindle extending within said sleeve and having a front end projecting therefrom and a rear end defining a closure member of a diameter slightly less than the internal diameter of the sleeve so as to be slightly spaced at its periphery from the sleeve and completely out of contact therewith, rollers positioned between the sleeve and the spindle adjacent the closure member to rotatably support the rear end portion of the spindle in the sleeve and to center the closure member in the sleeve, said rollers having their axes parallel to the axis of rotation of the spindle, a piston slidably and liquid-tightly fitted in said sleeve rearwardly of the closure member, means for securing the piston to the casing, bearing means rotatably supporting the spindle in the sleeve adjacent the front end portion of the spindle and means for supplying pressure liquid to the space within the sleeve between the closure member and the piston.

3. In a machine tool, a sliding rotatable spindle assembly comprising a hollow casing; an inner cylindrical sleeve slidably fitted in said casing; a spindle extending through said sleeve and coaxially and rotatably supported in said sleeve and having a front end projecting therefrom and a rear end substantially closing said sleeve except for a small peripheral clearance, said rear end being completely out of contact with said sleeve; roller means disposed adjacent to said rear end portion of the spindle for centering said rear end in said sleeve; a piston slidably and liquid-tightly fitted in the sleeve rearwardly of said rear end of the spindle; means connecting said piston to the casing for providing a stationary position of said piston with respect to said casing; and means for supplying pressure liquid to the space in the sleeve between the piston and the rear end of the spindle.

4. In a machine tool, a sliding rotatable spindle assembly comprising a hollow casing; an inner cylindrical sleeve slidably fitted in said casing and internally having in an intermediate part thereof a ring providing in said sleeve a restricted cross-section; a hollow spindle extending through said sleeve and having a front end projecting therefrom and a rear end located in said ring and defining a closure member thereof except for a peripheral clearance said rear end being completely out of contact with said sleeve; cylindrical rollers positioned between the sleeve and the spindle adjacent to the said closure member to rotatably support the rear end portion of the spindle in the sleeve and to center the closure member in the ring, said rollers having their axes parallel to the axis of rotation of the spindle; a conical bearing flaring towards the front end of said spindle and positioned intermediate the corresponding end of the sleeve and the spindle; a piston slidably and liquid-tightly fitted in said sleeve rearwardly of the closure member; means for securing the piston to the casing; and means for supplying pressure oil to the space within the sleeve between the closure member and the piston.

5. An assembly as claimed in claim 4, further comprising a second conical bearing oppositely flaring with respect to the first one and positioned rearwardly and close to said first conical bearing intermediate the said sleeve and said spindle.

6. A tailstock as claimed in claim 2, wherein the means for securing the piston to the casing comprises a rod secured to the piston along the axis thereof and extending rearwardly therefrom, said rod being externally threaded along the extremity of this extension; an apertured housing fixed on the rear end of said casing and provided with a threaded bore for cooperation with the threaded portion of said rod; and further comprising a closure plate secured to the end of the sleeve rearwardly to the piston to close said sleeve, said rod slidably and liquid-tightly passing through the closure plate; a threaded socket in said apertured housing cooperating with said threaded portion of the rod and arranged for projection towards said closure plate; and means for supplying pressure liquid to the space within the sleeve between the piston and said closure plate.

7. A machine-tool as claimed in claim 1, wherein said spindle is hollow and said closure member and said piston are axially bored and a shaft is slidably fitted within the spindle and extends rearwardly from said spindle and is secured against rotation relative thereto; packing means provided between said shaft and the bore of said closure member; a tube secured to the piston concentric to the bore thereof and extending rearwardly from the piston, said tube having an aperture provided at a distance from said piston, and said shaft passing through said tube with a small peripheral clearance; means for collecting liquid passing through the aperture of said tube; and a motor drivingly connected to the shaft rearwardly from said aperture for rotating said shaft.

References Cited in the file of this patent

UNITED STATES PATENTS

| 1,834,831 | Drummond | Dec. 1, 1931 |
| 1,970,023 | Schroeder | Aug. 14, 1934 |

(Other references on following page)

UNITED STATES PATENTS

| | | |
|---|---|---|
| 2,023,842 | Kingsbury | Dec. 10, 1935 |
| 2,270,522 | Haeger et al. | Jan. 20, 1942 |
| 2,494,196 | Pesqueira | Jan. 10, 1950 |
| 2,541,306 | Taylor | Feb. 13, 1951 |
| 2,614,447 | Tomazzo | Oct. 21, 1952 |
| 2,636,579 | De Haas | Apr. 28, 1953 |
| 2,740,258 | Weber | Apr. 3, 1956 |

FOREIGN PATENTS

| | | |
|---|---|---|
| 880,837 | Germany | June 25, 1953 |
| 1,036,585 | France | Sept. 6, 1953 |